(12) United States Patent
Kim

(10) Patent No.: US 9,279,572 B2
(45) Date of Patent: Mar. 8, 2016

(54) LIGHT EMITTING MODULE

(71) Applicant: LG INNOTEK CO., LTD., Seoul (KR)

(72) Inventor: Jong Hyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/355,321

(22) PCT Filed: Sep. 27, 2012

(86) PCT No.: PCT/KR2012/007802
§ 371 (c)(1),
(2) Date: Apr. 30, 2014

(87) PCT Pub. No.: WO2013/065953
PCT Pub. Date: May 10, 2013

(65) Prior Publication Data
US 2014/0286041 A1   Sep. 25, 2014

(30) Foreign Application Priority Data

Oct. 31, 2011 (KR) ........................ 10-2011-0112191

(51) Int. Cl.
*F21V 21/30* (2006.01)
*G02B 27/20* (2006.01)
*F21V 5/04* (2006.01)
*F21V 8/00* (2006.01)

(52) U.S. Cl.
CPC . *F21V 21/30* (2013.01); *F21V 5/04* (2013.01); *G02B 6/0005* (2013.01); *G02B 27/20* (2013.01)

(58) Field of Classification Search
USPC .................................................. 362/285–287
See application file for complete search history.

(56) References Cited

U.S. PATENT DOCUMENTS

| | | | | |
|---|---|---|---|---|
| 2004/0246732 | A1* | 12/2004 | Lewis | ........................... 362/475 |
| 2011/0216548 | A1* | 9/2011 | Fritz et al. | ..................... 362/466 |
| 2013/0010483 | A1* | 1/2013 | Ge | ................................. 362/460 |
| 2013/0039038 | A1* | 2/2013 | Jones | ........................... 362/106 |

FOREIGN PATENT DOCUMENTS

| | | |
|---|---|---|
| CN | 2750374 Y | 1/2006 |
| EP | 0704721 A2 | 4/1996 |
| JP | H09-281436 A | 10/1997 |
| JP | H11-85007 A | 3/1999 |
| JP | 2000-284220 A | 10/2000 |
| KR | 10-2000-0060380 A | 10/2000 |

OTHER PUBLICATIONS

English translation of JPH 1185007.*
English translation of JPH 1185007 (Mar. 30, 1999).*
International Search Report in International Application No. PCT/KR2012/007802, filed Sep. 27, 2012.
Office Action dated Nov. 18, 2015 in Chinese Application No. 201280053490.0.

* cited by examiner

*Primary Examiner* — Laura Tso
(74) *Attorney, Agent, or Firm* — Saliwanchik, Lloyd & Eisenschenk

(57) ABSTRACT

An exemplary embodiments of the present invention includes a light emitting body, a gyro sensor detecting a tremor, and a light emitting body tilt driving unit tilting the light emitting body in response to tremor information detected by the gyro sensor.

19 Claims, 2 Drawing Sheets

LIGHT EMITTING MODULE

CROSS-REFERENCE TO RELATED APPLICATIONS

This application is the U.S. national stage application of International Patent Application No. PCT/KR2012/007802, filed Sep. 27, 2012, which claims priority to Korean Application No. 10-2011-0112191, filed Oct. 31, 2011, the disclosures of each of which are incorporated herein by reference in their entirety.

TECHNICAL FIELD

The teachings in accordance with exemplary embodiments of this invention relate generally to a light emitting module.

BACKGROUND ART

Generally, a light emitting module like a hand-held laser pointer generates a tremor (trembling) in pointing out a long-distanced target. The effectiveness of such hand-held laser pointers for particularly pointing out a target is reduced by the unintentional tremor of the user's hand. Human tremor is an involuntary trembling or shaking of the muscles of the body associated with physical weakness, emotional stress, or excitement.

That is, a user holds the pointer in one hand and directs the laser beam towards a target, and a handshake of the user is transferred to the tremor of the laser pointer, because a diameter of laser beam is narrow, and the laser pointer is small and light-weighted.

Furthermore, the fact is that a robot or a manufacturing device using a laser vision suffers from accuracy due to tremor caused by vibration. A portable lighting device is also present with tremor.

Although a laser pointer lighting device has been developed for effective business and manufacturing and convenience, the laser pointer suffers from generation of tremor, resulting in decreased accuracy and/or visual inconvenience.

Meanwhile, one known art in the related field, Korean Registered Patent No. 2000-0060380 teaches a laser pointer equipped with hand tremor compensation function. However, the Korea patent suffers from disadvantages due to complicated structure and limitation to a general hand-held lighting device, such that there is an urgent need in the art for an improved and accurate light emitting device that substantially eliminates the abovementioned disadvantages.

DISCLOSURE OF INVENTION

Technical Problem

Accordingly, embodiments of the present invention may relate to a light emitting module that substantially obviates one or more of the above disadvantages/problems due to limitations and disadvantages of related art, and it is an object of the present invention to provide a light emitting module configured to compensate trembling of a light emitting body caused by hand shake of a user.

Technical problems to be solved by the present invention are not restricted to the above-mentioned statement, and any other technical problems not mentioned so far will be clearly appreciated from the following description by skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

Solution to Problem

In order to accomplish the above object, in one general aspect of the present disclosure, there is provided a light emitting module, the module comprising: a light emitting body; a gyro sensor detecting a tremor; and a light emitting body tilt driving unit tilting the light emitting body in response to tremor information detected by the gyro sensor.

Preferably, but not necessarily, the gyro sensor may be a sensor detecting the tremor and converting the tremor to an analogue signal or a digital signal, and the gyro sensor may further include a memory stored with a correction value configured to tilt the light emitting body relative to the tremor, and a driving chip receiving the analogue signal or the digital signal from the gyro sensor relative to the tremor, reading out a correction value tilting the light emitting body relative to the tremor stored in the memory, and outputting a control signal relative to the correction value read out from the memory to the light emitting body tilt driving unit.

Preferably, but not necessarily, the light emitting module may further comprise a case embedded with the light emitting body, wherein the light emitting body tilt driving unit is interposed between the light emitting body and the case.

Preferably, but not necessarily, the light emitting body may be embedded with a light emitting device, wherein the light emitting device is any one of an LED (Light Emitting Diode) and an electric bulb.

Preferably, but not necessarily, the light emitting module may further comprise a PCB (Printed Circuit Board) mounted with the light emitting device.

Preferably, but not necessarily, the PCB or the case may be mounted with the gyro sensor.

Preferably, but not necessarily, the case may be mounted with the gyro sensor.

Preferably, but not necessarily, the gyro sensor may be a single axis sensor or a multiple axis sensor.

Preferably, but not necessarily, the gyro sensor may be installed on a substrate connected to the PCB via a connector.

Preferably, but not necessarily, the gyro sensor may be embedded inside the light emitting module.

Preferably, but not necessarily, the light emitting body may include an optical guide configured to guide light emitted from the light emitting device and to linearly advance the light to a target.

Preferably, but not necessarily, the light emitting body may include a lens configured to guide the light emitted from the light emitting device and to concentrate the light to the target.

Preferably, but not necessarily, the light emitting body may include a reflective structure configured to reflect the light emitted from the light emitting device to the target.

Preferably, but not necessarily, the light emitting body tilt driving unit may include a first driving unit configured to tilt the light emitting body to a first axis, and a second driving unit configured to tilt the light emitting body to a second axis.

Preferably, but not necessarily, the first and second driving units may be respectively a magnet and a coil positioned at an inner side or an external side of the light emitting body, wherein the magnet and the coil are spaced apart at a predetermined distance.

Preferably, but not necessarily, the light emitting module may further comprise an elastic unit configured to restore the light emitting body to an original position, in a case an electromagnetic interaction of the magnet and coil of the first and second driving units disappears.

Preferably, but not necessarily, the elastic unit may be connected to the case and the light emitting body.

Preferably, but not necessarily, each of the first and second driving units may include a coil wound on the light emitting body, and a magnet spaced apart from the coil at a predetermined distance.

Preferably, but not necessarily, the first and second driving units may be spaced apart to prevent a magnetic force from interfering each other.

Preferably, but not necessarily, the light emitting module may further comprise a case embedded with the light emitting body, wherein the first driving unit is formed on an upper surface of the case and the light emitting body, and the second driving unit is formed at a bottom surface of the case and the light emitting body.

Preferably, but not necessarily, the light emitting module may further comprise a case embedded with the light emitting body, wherein the first driving unit is formed on one surface of the case and the light emitting body, and the second driving unit is formed at the other surface of the case and the light emitting body.

Advantageous Effects of Invention

A light emitting module according to exemplary embodiments of the present invention has an advantageous effect in that a light emitting body is corrected of tremor caused by handshake of a user to allow light emitted from the light emitting body to be irradiated to a target without tremor.

Another advantageous effect is that tremor of light irradiated to a target is corrected to allow performing an accurate pointing operation and light irradiation process, whereby a visual inconvenience by an observer can be removed to enhance yield in the manufacturing process.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
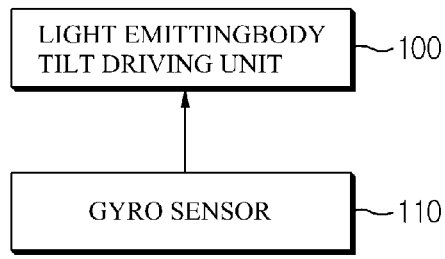
FIG. 1 is a schematic block diagram illustrating configuration of a light emitting module according to an exemplary embodiment of the present invention.

Hereinafter, exemplary embodiments of the present invention will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

In the drawings, the size and relative sizes of layers, regions and/or other elements may be exaggerated or reduced for clarity. Like numbers refer to like elements throughout and explanations that duplicate one another will be omitted.

The suffixes 'module', 'unit' and 'part' may be used for elements in order to facilitate the invention. Significant meanings or roles may not be given to the suffixes themselves and it is understood that the 'module', 'unit' and 'part' may be used together or interchangeably.

FIG. 1 is a schematic block diagram illustrating configuration of a light emitting module according to an exemplary embodiment of the present invention.

Referring to FIG. 1, a light emitting module includes a light emitting body (not shown), a gyro sensor (110) detecting a tremor, and a light emitting body tilt driving unit (100, hereinafter referred to as driving unit) tilting the light emitting body in response to tremor information detected by the gyro sensor (110). The gyro sensor (110) is located near to the light emitting body, and the tremor of a user is transmitted to the light emitting body and the gyro sensor (110).

Thus, the gyro sensor (110) can detect the tremor, and the driving unit (100) can tilt the light emitting body in response to the tremor information detected by the gyro sensor (110) to correct tremor of light beam by the tremor of the user.

Meanwhile, the driving unit (100) corrects the tremor by tilting the light emitting body to a direction where vibration caused by tremor is compensated. Furthermore, the gyro sensor (110) detects the tremor, converts the tremor to an analogue signal or a digital signal and transmits the signal to a driving chip (not shown), where the driving unit is so configured as to read out a correction value configured to tilt the light emitting body relative to the tremor stored in a memory, output a control signal relative to the correction value read out from the memory to the driving unit (100) and correct the tremor.

The light emitted from the light emitting body may be light irradiated to a target for performing a pointing operation for pointing out a particular area, or light irradiated to a target for etching of a particular area, where the pointing operation is to point laser beam to a blackboard or a screen using a conventional laser pointer, and the etching of a particular area is an etching process used in manufacturing process for electronic parts such as semiconductors, LCDs and substrates, where laser beam can be used to etch a target area.

Therefore, the light emitting module according to an exemplary embodiment of the present invention is advantageous in that tremor (trembling) of light irradiated to a target is corrected to perform an accurate pointing operation and light irradiation process, whereby a visual inconvenience can be removed to obtain a higher yield in manufacturing process.

Figure 2:
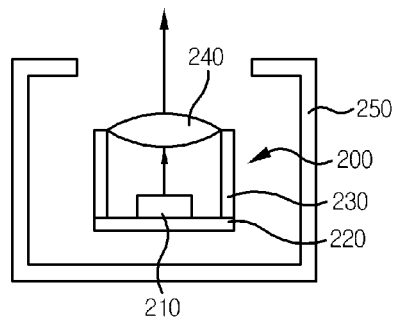
FIG. 2 is a mimetic cross-sectional view illustrating configuration of a light emitting module according to an exemplary embodiment of the present invention.
Figure 3A:
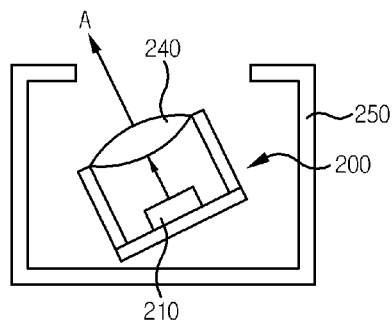
FIGS. 3a and 3b are mimetic cross-sectional views illustrating a tilt of a light emitting module by handshake according to an exemplary embodiment of the present invention.
Figure 3B:
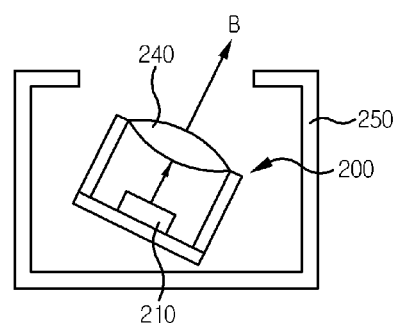
Figure 4:
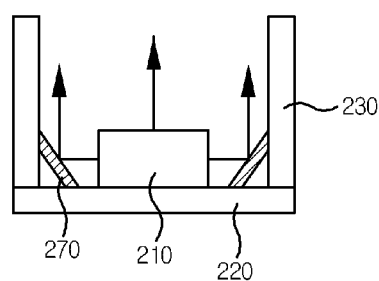
FIG. 4 is a mimetic cross-sectional view illustrating configuration of a light emitting module according to another exemplary embodiment of the present invention.

FIG. 2 is a mimetic cross-sectional view illustrating configuration of a light emitting module according to an exemplary embodiment of the present invention, FIGS. 3a and 3b are mimetic cross-sectional views illustrating a tilt of a light emitting module by handshake according to an exemplary embodiment of the present invention, and FIG. 4 is a mimetic cross-sectional view illustrating configuration of a light emitting module according to another exemplary embodiment of the present invention.

Referring to FIG. 2, a light emitting module according to an exemplary embodiment of the present invention includes a case (250) embedded with a light emitting body (200), a light emitting body tilt driving unit (100) of FIG. 1 is positioned between the light emitting body (200) and the case (250) to tilt the light emitting body (250) in response to the tremor.

The light emitting body (200) is formed therein with a light emitting device (210), and light emitted from the light emitting device (210) advances upwards of the light emitting body (200) to be irradiated to a target. Furthermore, the light emitting device (210) may be realized by any one of an LED, a laser diode and an electric bulb, or may be embodied by a module or a packaged element. However, the present invention is not limited thereto.

The light emitting body (200) may include a PCB (Printed Circuit Board, 220) mounted with the light emitting device (210). The PCB or the case may be mounted with a gyro sensor (not shown), where the gyro sensor may a single axis sensor or a multiple axis sensor. The gyro sensor may be installed on a separate substrate (not shown) connected to the PCB via a connector. That is, the gyro sensor may be installed inside the light emitting module, or positioned outside of the light emitting module by being separated from the light emitting module.

In addition, the light emitting body (200) may be an optical guide (230) configured to guide light emitted from the light emitting device (210) and to linearly advance the light to a target. The light emitting body (200) may be a lens (240) configured to guide the light emitted from the light emitting device (210) and to concentrate the light to the target.

As noted from the foregoing, the light emitting module according to an exemplary embodiment of the present invention is configured such that the light emitting body (200) is tilted to the left side by a light emitting body tilt driving unit (driving unit) driven in response to tremor to emit light to 'A' path where the tremor is corrected, as shown in FIG. 3a, or the light emitting body (200) is tilted to the right side by the driving unit driven in response to tremor to emit light to 'B' path where the tremor is corrected, as shown in FIG. 3b.

Referring to FIG. 4, the light emitting module according to an exemplary embodiment of the present invention is structured such that the light emitting body (200) may include a reflective structure (270) configured to reflect light emitted from the light emitting device (210) to an upward direction (to a target direction). At this time, the reflective structure (270) may be installed at the PCB (220) around the light emitting device (210), or may be directly or indirectly installed at the light emitting device (210).

The case (250) is formed with a space in which the light emitting body (200) can be housed, and a predetermined gap is maintained between the light emitting body (200) and the case (250). The driving unit may include a first driving unit configured to tilt the light emitting body (200) to a first axis, and a second driving unit configured to tilt the light emitting body (200) to a second axis.

The first and second driving units may be respectively a magnet and a coil positioned at an inner side or an external side of the light emitting body (200), and where the magnet and the coil may be spaced apart at a predetermined distance.

For example, each of the first and second driving units may be a magnet attached to the light emitting body (200) and a coil distanced from the magnet and wound on the magnet. Alternatively, each of the first and second driving units may be a coil wound on the magnet, and a magnet attached to the light emitting body (200) by being distanced from the coil.

The magnet and the coil of the first driving unit are oppositely formed, and the magnet and the coil of the second driving unit are also oppositely formed, and in a case a power source is applied to the coils of the first and second driving units, a driving force is generated to a vertical direction or a horizontal direction by electromagnetic interaction. At this time, the light emitting body (200) is horizontally or vertically tilted to correct the tremor phenomenon of light emitted from the light emitting device (210) and irradiated to a target.

Furthermore, the first driving unit is spaced apart from the second driving unit to prevent magnetic force from being mutually interfered therebetween. For example, the first driving unit may be formed on an upper surface of the case (250) and the light emitting body (200), or the second driving unit is formed at a bottom surface of the case (250) and the light emitting body (200).

Alternatively, the first driving unit may be formed on one surface of the case (250) and the light emitting body (200), and the second driving unit may be formed at the other surface of the case (250) and the light emitting body (200). That is, the positions of the first and second driving units may be variably changed, such that it is preferable that the positions of the first and second driving units be determined to maximally correct the tremor of light emitted from the light emitting body (200).

The light emitting module may further comprise an elastic unit (not shown) or a Hall sensor (not shown) configured to restore the light emitting body (200) to an original position, in a case an electromagnetic interaction of the magnet and coil of the first and second driving units disappears.

The elastic unit may be realized by such member as a wire spring having an excellent restoring force restored to an original position, in a case a power supply is stopped to the coils of the first and second driving units to make the electromagnetic interaction non-existent. The elastic unit is connected to the light emitting body (200) and the case (250), and in a case the first and second driving units are turned on, the elastic unit is deformed to prevent the tilting of the light emitting body (200) from being interrupted, and in a case the first and second driving units are turned off, the elastic unit is restored to make the light emitting body (200) restored to an original position.

Mode for the Invention

Figure 5:
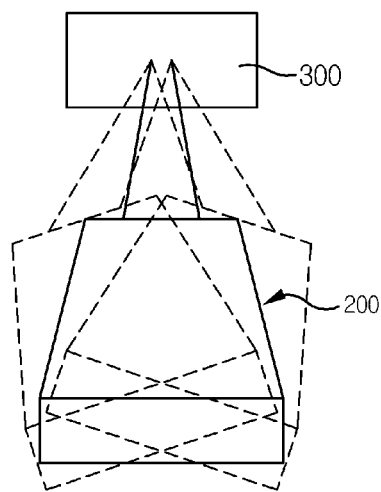
FIG. 5 is mimetic view illustrating a method for correcting a multiple tremor by handshake of the light emitting module according to an exemplary embodiment of the present invention

FIG. 5 is mimetic view illustrating a method for correcting a multiple tremor by handshake of the light emitting module according to an exemplary embodiment of the present invention.

The light emitting module according to an exemplary embodiment of the present invention is structured such that in a case the light emitting body (200) is trembled by tremor or shake of a user, the light emitting body (200) is tilted to a direction opposite to a tremor direction of the light emitting body (200) to correct light emitted from the light emitting body (200). For example, in a case the light emitting body (200) is subtly moved to a left direction, the light emitting body tilt driving unit (driving unit) tilts the light emitting body (200) to a right direction to allow light to be fixed to a target (300). At this time, the driving unit can correct the trembling to a multiple axis of up, down, left and right axes and also continuously perform the corrective operation.

Furthermore, the memory can be stored with an optimal correction value in response to a distance between the light emitting body (200) and the target (300), the light emitting body (200) can include a distance detection sensor for detecting a distance to the target (300), and the abovementioned driving chip can read out a correction value corresponding to the tremor detected by the gyro sensor and the distance to the target detected by the distance detection sensor to drive the light emitting body tilt driving unit, whereby, the trembling of irradiated light can be optimally removed, even if the distance between the light emitting body (200) and the target (300) is far-distanced.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the present invention has an industrial applicability in that tremor (trembling) of light irradiated to a target is corrected to perform an accurate pointing operation and light irradiation process, whereby a visual inconvenience can be removed to increase yield in manufacturing process.

The invention claimed is:

1. A light emitting module comprising: a light emitting body; a gyro sensor detecting a tremor; and a light emitting body tilt driving unit tilting the light emitting body in response to tremor information detected by the gyro sensor;
   wherein the light emitting body is embedded with a light emitting device, wherein the light emitting device is any one of an LED (Light Emitting Diode) and an electric bulb, and
   wherein the light emitting body includes a reflective structure configured to reflect the light emitted from the light emitting device to a target.

2. The light emitting module of claim 1, wherein the gyro sensor is a sensor detecting the tremor and converting the tremor to an analogue signal or a digital signal, and the gyro sensor further includes a memory stored with a correction value configured to tilt the light emitting body relative to the tremor, and a driving chip receiving the analogue signal or the digital signal from the gyro sensor relative to the tremor, reading out a correction value tilting the light emitting body relative to the tremor stored in the memory, and outputting a control signal relative to the correction value read out from the memory to the light emitting body tilt driving unit.

3. The light emitting module of claim 1, further comprising a case embedded with the light emitting body, wherein the light emitting body tilt driving unit is interposed between the light emitting body and the case.

4. The light emitting module of claim 1, further comprising a PCB (Printed Circuit Board) mounted with the light emitting device.

5. The light emitting module of claim 4, wherein the PCB or the case is mounted with the gyro sensor.

6. The light emitting module of claim 3, wherein the case is mounted with the gyro sensor.

7. The light emitting module of claim 6, wherein the gyro sensor is a single axis sensor or a multiple axis sensor.

8. The light emitting module of claim 4, wherein the gyro sensor is installed on a substrate connected to the PCB via a connector.

9. The light emitting module of claim 1, wherein the gyro sensor is embedded inside the light emitting module.

10. The light emitting module of claim 1, wherein the light emitting body includes an optical guide configured to guide light emitted from the light emitting device and to linearly advance the light to the target.

11. The light emitting module of claim 1, wherein the light emitting body includes a lens configured to guide the light emitted from the light emitting device and to concentrate the light to the target.

12. The light emitting module of claim 1, wherein the light emitting body tilt driving unit includes a first driving unit configured to tilt the light emitting body to a first axis, and a second driving unit configured to tilt the light emitting body to a second axis.

13. The light emitting module of claim 12, wherein the first and second driving units are respectively a magnet and a coil positioned at an inner side or an external side of the light emitting body, wherein the magnet and the coil are spaced apart at a predetermined distance.

14. The light emitting module of claim 12, further comprising an elastic unit configured to restore the light emitting body to an original position, in a case an electromagnetic interaction of the magnet and coil of the first and second driving units disappears.

15. The light emitting module of claim 14, wherein the elastic unit is connected to the case and the light emitting body.

16. The light emitting module of claim 12, wherein each of the first and second driving units includes a coil wound on the light emitting body, and a magnet spaced apart from the coil at a predetermined distance.

17. The light emitting module of claim 12, wherein the first and second driving units are spaced apart to prevent a magnetic force from interfering each other.

18. The light emitting module of claim 17, further comprising a case embedded with the light emitting body, wherein the first driving unit is formed on an upper surface of the case and the light emitting body, and the second driving unit is formed at a bottom surface of the case and the light emitting body.

19. The light emitting module of claim 17, further comprising a case embedded with the light emitting body, wherein the first driving unit is formed on one surface of the case and the light emitting body, and the second driving unit is formed at the other surface of the case and the light emitting body.

* * * * *